United States Patent [19]
Yasuda et al.

[11] Patent Number: 4,875,116
[45] Date of Patent: Oct. 17, 1989

[54] TRANSDUCER POSITION CONTROL SYSTEM FOR DATA TRANSFER APPARATUS EMPLOYING DISKLIKE RECORD MEDIA

[75] Inventors: Kazuhiko Yasuda, Fussa; Sumio Wada, Koga, both of Japan

[73] Assignee: Teac Corporation, Tokyo, Japan

[21] Appl. No.: 153,999

[22] Filed: Feb. 9, 1988

[30] Foreign Application Priority Data

Feb. 19, 1987 [JP] Japan .................................. 62-37414

[51] Int. Cl.$^4$ ............................................. G11B 5/596
[52] U.S. Cl. ............................... 360/78.11; 360/77.03
[58] Field of Search ............................ 360/77.03, 78.11

[56] References Cited

U.S. PATENT DOCUMENTS

| | | | |
|---|---|---|---|
| 3,755,795 | 8/1973 | Sordello et al. | 360/78.11 |
| 3,812,533 | 5/1974 | Kimura et al. | 360/77.03 |
| 4,125,882 | 11/1978 | Erickson, Sr. et al. | 360/78.11 |
| 4,263,627 | 4/1981 | Rose et al. | 360/78.06 |
| 4,270,073 | 5/1981 | Human | 360/77.03 |
| 4,396,959 | 8/1983 | Harrison | 360/77.08 |
| 4,481,613 | 11/1984 | Yokota | 360/78.11 |
| 4,494,159 | 1/1985 | Takayama et al. | 360/78.11 |
| 4,560,927 | 12/1985 | Ishida et al. | 324/166 |
| 4,590,527 | 5/1986 | Warner | 360/78.11 |
| 4,707,754 | 11/1987 | Patel et al. | 360/77.03 |

*Primary Examiner*—Alan Faber
*Assistant Examiner*—David L. Robertson
*Attorney, Agent, or Firm*—Woodcock Washbutn Kurtz

[57] ABSTRACT

In a data storage and retrieval system employing a magnetic disk as the storage medium, a monophase encoder is coupled, typically, to an electric seek motor for optoelectronically producing an output representative of the position of a data transducer with respect to a multiplicity of concentric data tracks on the disk. Electrically connected to the monophase encoder is a triple detector circuit for deriving from the encoder output a transducer position signal representative of the transducer position on the disk, an actual transducer speed signal representative of the transducer speed relative to the disk, and a track boundary signal representative of boundaries between the data tracks on the disk. The transducer position signal and actual transducer speed signal are both fed to a seek motor control circuit, whereas the track boundary signal is fed to a controller microprocessor, which then delivers to the seek motor control circuit a requested transducer speed signal at which the transducer is to be moved across the data tracks during operation in a seek mode. In response to the incoming signals the control circuit controls the seek motor for transporting the transducer to a desired track at a desired speed and for positioning the transducer in centerline alignment with the track.

7 Claims, 9 Drawing Sheets

(A) ENCODER OUTPUT & ITS INVERSION (B) TRACK BOUNDARY SIGNAL (C) DIFFERENTIATOR OUTPUTS (D) SIGNALS FROM SWITCHES 130 & 132

(E) TRANSDUCER SPEED SIGNAL

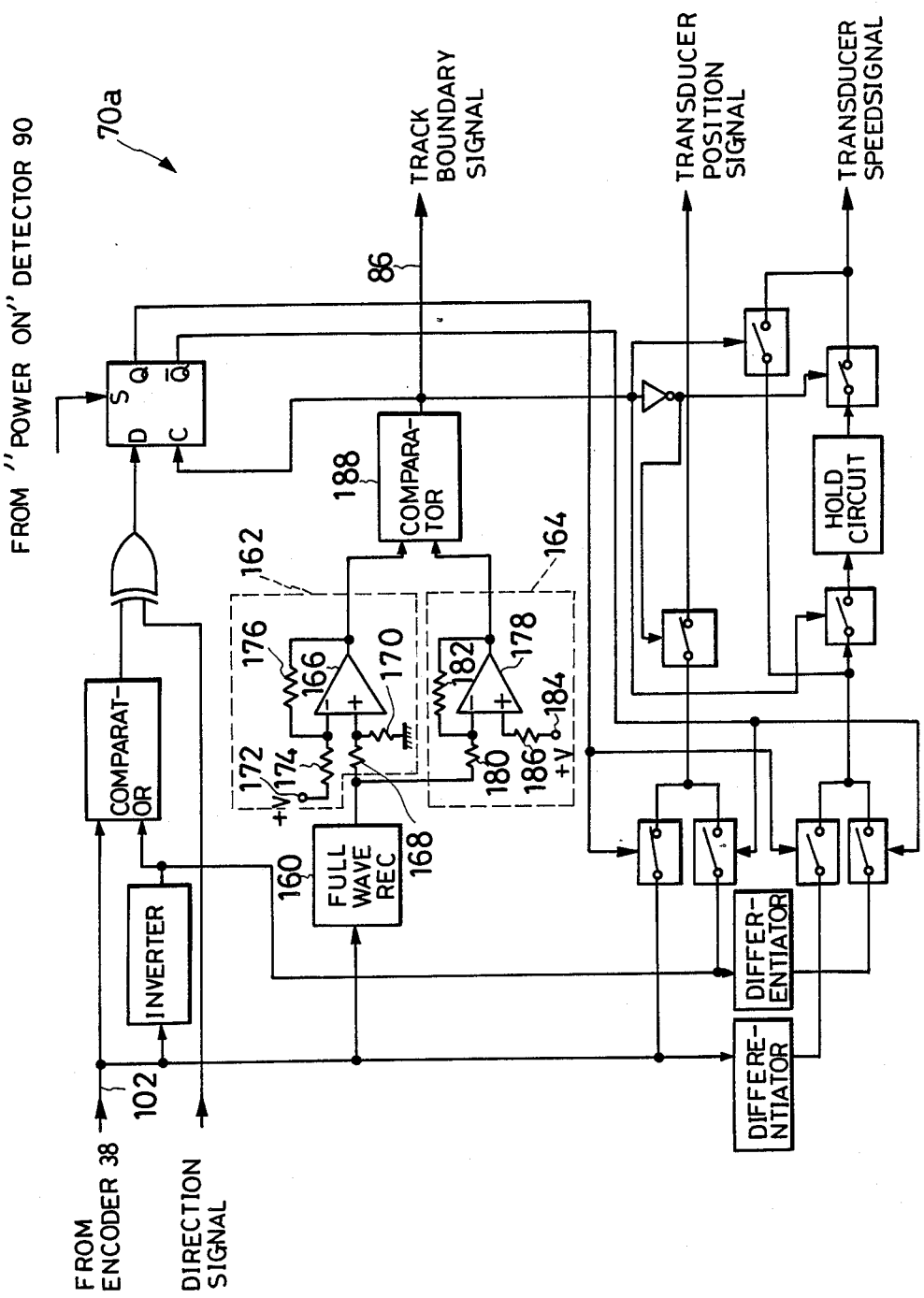

TRANSDUCER POSITION CONTROL SYSTEM FOR DATA TRANSFER APPARATUS EMPLOYING DISKLIKE RECORD MEDIA

BACKGROUND OF THE INVENTION

Our invention relates generally to apparatus having a data transducer for reading and/or writing of data on disklike record media such as magnetic disk and, particularly, those of the "fixed" or hard disk variety. More particularly, our invention has to do with an improved system for controlling the position of the transducer with respect to a multiplicity of concentric data tracks on the disk.

It has been known to employ a two-phase encoder or optoelectronic transducer for detecting the positional relationship between the data transducer or head and the data tracks on the magnetic disk. The provision of the two-phase output requires two light sources and two photodetectors arranged with a phase difference of 90 degrees on both sides of a multiple apertured rotary disk or scale. This conventional encoder configuration is not so simple as can be desired.

We cite U.S. Pat. No. 4,396,959 to Harrison et al. as the prior art comparable to our invention. It describes and claims a transducer position control system in an environment of an eight inch diameter, hard magnetic disk memory system. A key feature of this known transducer position control system is what may be described as a polyphase encoder or electro-optical transducer. It comprises a light source such as a controlled current light emitting diode, a scale rotatable with the head structure and having a series of equally closely spaced microscopic radial lines, and an integrated circuit photosensitive array, which in combination produce a polyphase sawtooth servo waveform. The photosensitive array must provide five outputs, four of these being quadrature track position signals and the fifth being a signal indicative of the location of the head at track zero. We object, here again, to the complex configuration of the polyphase encoder.

SUMMARY OF THE INVENTION

We have hereby invented an improved transducer position control system in apparatus for data transfer with a disklike record medium, employing a monophase encoder of materially simpler construction than the conventional polyphase encoders for moving the data transducer from track to track on the record medium and for accurately positioning the transducer in centerline alignment with each destination track.

Briefly, our invention may be summarized as an apparatus having a transducer for data transfer with a disklike record medium having a multiplicity of concentric data tracks, and positioning means including an electric seek motor for transporting the transducer across the data tracks on the record medium and for positioning the transducer on any desired track. Also included is a monophase encoder comprising a fixed member having an aperture defined therein, and a movable member disposed opposite the fixed member for bidirectional movement relative to the same with the movement of the transducer with respect to the data tracks on the record medium. The movable member has defined therein a multiplicity of equally spaced apertures arranged in a row in the direction of the movement of the movable member. The encoder further comprises a light source and a photodetector, the latter being irradiated by the former when each aperture in the movable member comes into register with the aperture in the fixed member. The photodetector provides an electric output varying in magnitude with the intensity of irradiation by the light source.

The geometry of the apertures in the movable member of the monophase encoder must be determined in relation to the arrangement of the data tracks on the record medium. Specifically, the dimensions of each aperture, and of each space between the apertures, in the movable member as measured substantially in the direction of the movement of the movable member is equal to each other and to the pitch of the data tracks on the record medium. Further the apertures in the movable member are in prescribed phase relation to the data tracks on the record medium, such that the centerlines of the apertures and of the intervening spaces, extending across the direction of movement of the movable member, correspond to the boundaries between the data tracks, and the side edges of the apertures, also extending across the direction of movement of the movable member, correspond to the centerlines of the data tracks.

The apparatus further comprises a detector circuit connected to the photodetector of the monophase encoder for deriving from its output a transducer position signal indicative of the position of the transducer with respect to the data tracks on the record medium. The detector circuit delivers the transducer position signal to control circuit means, enabling the same to control the seek motor for positioning the transducer on a desired data track on the record medium in centerline alignment therewith.

The above phase relationship between the apertures in the movable member and the data tracks on the record medium realizes the provision of the monophase encoder output containing the positional information of the transducer with respect to the tracks. That is because the encoder output is at a maximum or a minimum when the transducer is on a boundary between any two data tracks, and at a midpoint between the maximum and the minimum when the transducer is on the centerline of each track. The transducer position signal can thus be obtained which increases or decreases in magnitude with time, depending upon the traveling direction of the transducer, when it is at or adjacent the centerline of each data track.

Such is the output from the monophase encoder of our invention that, in a preferred embodiment, the detector circuit derives from the encoder output not only the transducer position signal but also a transducer speed signal representative of the speed at which the transducer travels across the data tracks on the record medium, and a track boundary signal representative of the boundaries between the data tracks. The transducer speed signal and the track boundary signal are also used for controlling the track seeking operation of the transducer. It should be appreciated that the monophase encoder requires but one light source and one photodetector to provide all the information needed for the three different signals.

The above and other features and advantages of our invention and the manner of realizing them will become more apparent, and the invention itself will best be understood, from a study of the following description and appended claims, with reference had to the attached drawings showing some preferred embodiments of our invention.

BRIEF DESCRIPTION OF THE DRAWINGS

FIG. 9 is a block diagram of an alternative triple detector circuit; and

DESCRIPTION OF THE PREFERRED EMBODIMENTS

Figure 1:
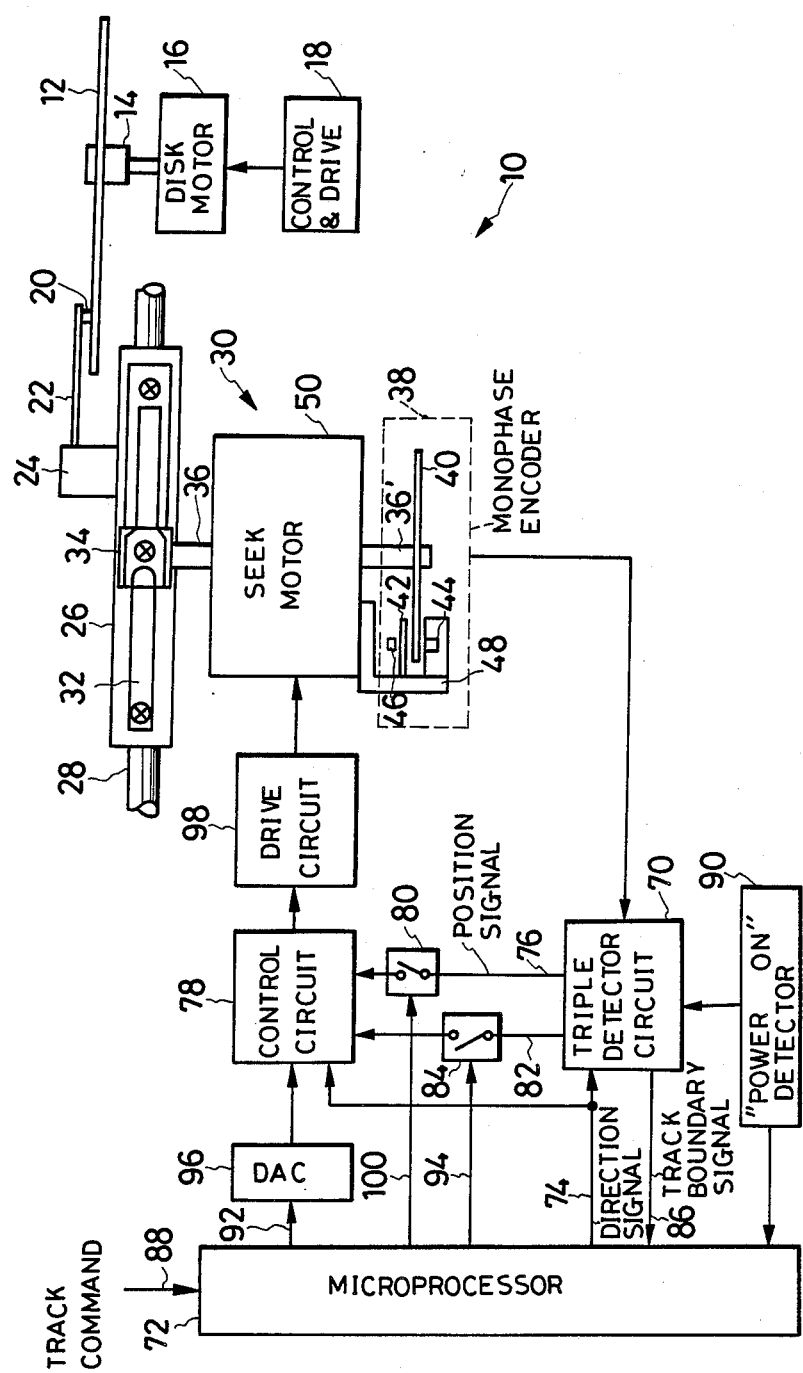
FIG. 1 is a block diagram of a data storage and retrieval system employing a magnetic disk as the storage medium and incorporating the transducer position control system of our invention.

We will now describe our invention in detail in an environment of a hard disk data storage and retrieval system generally designated 10 in FIG. 1. Included is at least one hard magnetic disk 12 mounted fast on a drive hub 14 which is coupled directly to a disk drive motor 16. This motor is electrically connected to a control and drive circuit 18 thereby to be controllably energized for revolving the disk 12 at relatively high speed. We assume for convenience only that the disk 12 is single sided. Thus only one electromagnetic transducer or head 20 is shown mounted to a distal end of a head support beam 22 of resilient material for data transfer with one side of the disk 12 on which is formed a series of concentric data tracks yet to be discussed. The support beam 22 is proximally cantilevered to a post 24 on a carriage 26. At least one guide bar 28 guides the linear travel of the carriage 26 and hence of the transducer 20 radially with respect to the disk 12.

A carriage actuator in the form of a brushless direct current motor 30 is provided for incrementally driving the carriage 26 back and forth along the guide bar 28. We will refer to this motor 30 as the "seek motor" since it enables the transducer 20 to seek one data track to another on the disk 12. In order to translate the angular motion of the seek motor 30 into the linear motion of the carriage 26 we have employed a familiar slotted steel belt 32 which is wound a single turn around a pulley 34 on the seek motor armature shaft 36 and which has its opposite ends anchored to the carriage 26.

Closely associated with the seek motor 30 is a monophase encoder 38 constituting a feature of our invention. The encoder 38 comprises a multiple apertured rotary disk 40 rotatable with the seek motor 30, a signal apertured fixed plate 42, a light source 44 and a photodetector 46. The multiapertured disk 40 is mounted fast on an armature shaft extension 36' of the seek motor 30, whereas the single apertured plate 42, light source 44 and photodetector 46 are all rigidly mounted to a common bracket 48 on the housing 50 of the seek motor 30.

Figure 2:
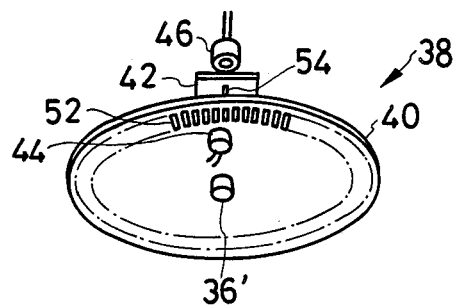
FIG. 2 is a view in perspective of the monophase encoder used in the transducer position control system of FIG. 1.

FIG. 2 better illustrates the encoder 38 in perspective. The rotary disk 40 has a multiplicity of rectangular apertures or slits 52 formed therein in radial arrangement. The fixed plate 42 has but one rectangular aperture or slit 54 for selective registration with the aperture 52 in the rotary disk 40 with the rotation of the latter. The light source 44 and the photodetector 46 are so arranged that the former will irradiate the latter to the maximum degree each time one of the rotary disk apertures 52 comes into registry with the fixed plate aperture 54.

Figure 3:
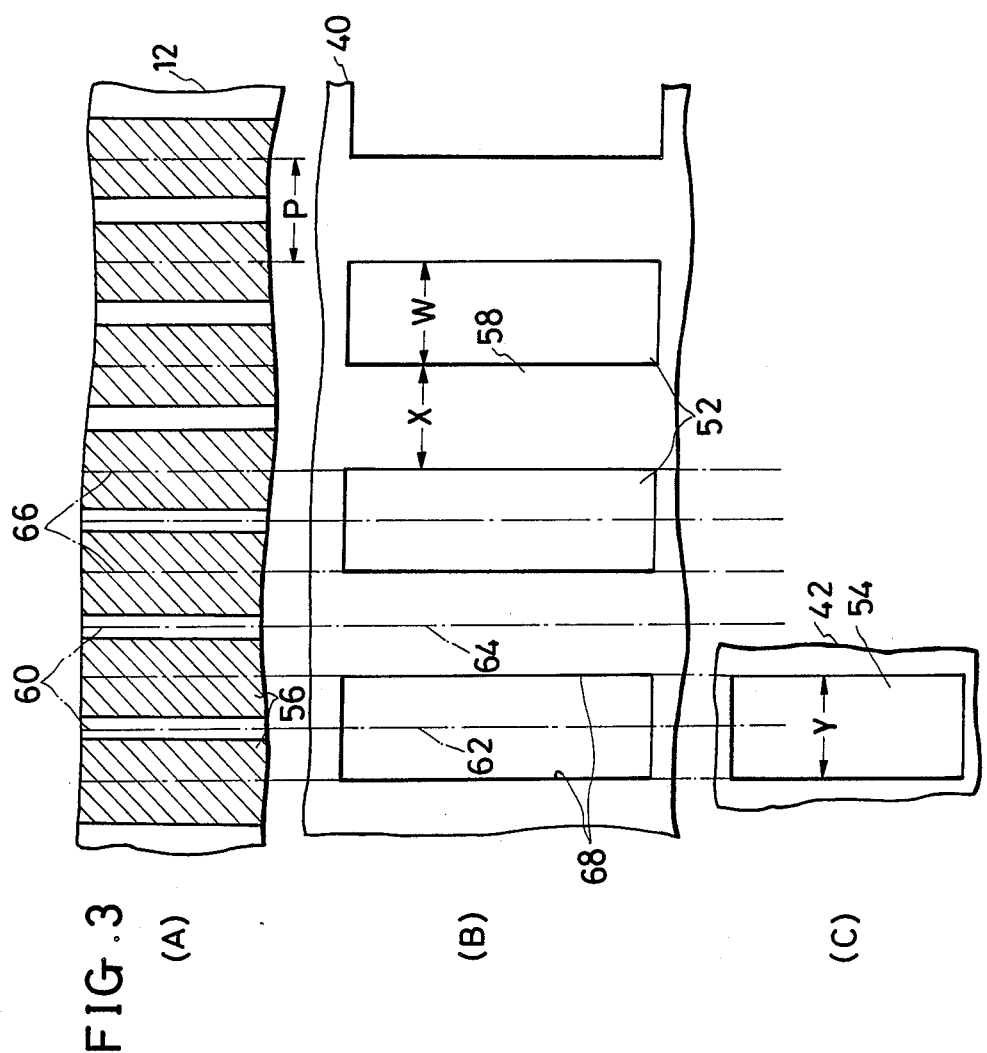
FIG. 3, consisting of (A)–(C), is a fragmentary diagrammatic plan view explanatory of the phase relationship between the data tracks on the magnetic disk, and the apertures in the movable and fixed members of the monophase encoder.

Reference is directed to FIG. 3 for a study of the relationship among the data tracks 56 on the magnetic disk 12, the apertures 52 in the rotary disk 40, and the aperture 54 in the fixed plate 42. Although the illustrated fragments of the data tracks 56 appear rectilinearly at (A) in FIG. 3 for illustrative convenience, we understand, of course, that the data tracks are arranged concentrically on the magnetic disk 12 with the same pitch P. Some of the rotary disk apertures 52 are also not shown radially but parallel to each other at (B) in FIG. 3 for convenience only.

Dimensionally, the pitch P of the data tracks 56 on the magnetic disk 12, the width W of each aperture 52 in the rotary disk 40, the width X of each rotary disk portion 58 between any two neighboring apertures 52, and the width Y of the aperture 54 in the fixed plate 42 are all equal to one another.

Further the rotary disk 40 rotates with its apertures 52 in prescribed phase relation to the data tracks 56 on the magnetic disk 12. When one of the rotary disk apertures 52 is in register with the fixed plate aperture 54 as shown in FIG. 3, the boundaries 60 between the data tracks 56 agree with the centerlines 62 of the apertures 52 and with the centerlines 64 of the rotary disk portions 58, whereas the centerlines 66 of the data tracks 56 agree with the rotary disk edges 68 bounding the longitudinal sides of the apertures 52. The electric output from the photodetector 46 will then be at a maximum. The data track boundaries 60 will also agree with the rotary disk aperture centerlines 62 and with the rotary disk portion centerlines 64 when one of the rotary disk portions 58 comes into register with the fixed plate aperture 54, shielding the photodetector 46 from the light source 44. The electric output from the photodetector 46 will then be at a minimum.

With reference back to FIG. 1 the monophase encoder 38 has its photodetector 46 coupled to an input of what we call a triple detector circuit 70, since this circuit derives three different signals from the monophase encoder output. Another input of the triple detector circuit 70 is connected to a digital system controller microprocessor 72 by way of a TRANSDUCER DIRECTION signal line 74. The triple detector circuit 70 generates: (a) a TRANSDUCER POSITION signal representative of the position of the transducer 20 with respect to the data tracks 56 on the magnetic disk 12 in response to the monophase encoder output and to the TRANSDUCER DIRECTION (i.e. radially inward or outward of the magnetic disk 12) signal from the microprocessor 72; (b) an ACTUAL TRANSDUCER SPEED signal representative of the traveling speed of the transducer 20 with respect to the magnetic disk 12 in response to the monophase output from the encoder 38; and (c) a TRACK BOUNDARY signal representative of the track boundaries 60 on the magnetic disk 12 in response to the monophase encoder output. The TRANSDUCER POSITION signal is sent over a line 76 to a seek motor control circuit 78 via a switch 80. The ACTUAL TRANSDUCER SPEED signal is sent over a line 82 also leading to the control circuit 78 via another switch 84. The TRACK BOUNDARY signal is sent over a line 86 to the microprocessor 72. We will later detail the construction of the triple detector circuit 70 with reference to FIG. 4.

The microprocessor 72 further inputs a TRACK COMMAND signal over a line 88 and a POWER ON signal from a "power on" detector 90. As the name implies, the "power on" signal represents the fact that the data system 10 has been electrically turned on. In response to the incoming TRACK COMMAND, TRACK BOUNDARY and POWER ON signals the microprocessor 72 puts out digital seek motor control data, including a REQUESTED TRANSDUCER SPEED signal, over a line 92, the TRANSDUCER DIRECTION signal over the line 74 and a SPEED CONTROL PERIOD signal over a line 94. The REQUESTED TRANSDUCER SPEED signal represents the desired speed at which the transducer 20 is to be transported in seeking a new track on the magnetic disk 12. The SPEED CONTROL PERIOD signal represents operation in the seek mode, with the traveling speed of the transducer controlled by the REQUESTED TRANSDUCER SPEED signal.

The REQUESTED TRANSDUCER SPEED signal output line 92 of the microprocessor 72 is connected via a digital to analog converter (DAC) 96 to the seek motor control circuit 78, which in turn is connected to the seek motor 30 via a drive circuit 98. In addition to the input connected to the DAC 96 the seek motor control circuit 78 has inputs connected to the TRANSDUCER DIRECTION signal line 74, to the TRANSDUCER POSITION signal line 76 and to the ACTUAL TRANSDUCER SPEED signal line 82. The switch 80 on the TRANSDUCER POSITION signal line 76 is to be turned on by a POSITION CONTROL PERIOD SIGNAL fed from the microprocessor 72 by way of a line 100 when the transducer 20 is to be aligned on the centerline of the new data track after each track seeking operation. During each such position control or centering period the REQUESTED TRANSDUCER SPEED signal from the DAC 96 has a prescribed magnitude for use as a reference voltage for the centerline alignment of the transducer, as will become apparent from the subsequent description of operation. The other switch 84 on the ACTUAL TRANSDUCER SPEED signal line 82 is to be closed by the SPEED CONTROL PERIOD signal fed from the microprocessor 72 by way of the line 94 during operation in the seek mode.

The seek motor control circuit 78 performs two control functions: (a) the determination of the traveling speed of the transducer 20 during operation in the seek mode, and (b) the centering of the transducer after the seek operation. During each speed control (seek) period the seek motor control circuit 78 controls the speed of the seek motor 30 so as to make zero the difference between the REQUESTED TRANSDUCER SPEED signal fed from the microprocessor 72 over the line 92 and the ACTUAL TRANSDUCER SPEED signal fed from the triple detector circuit 70 over the line 82. For the centering function, on the other hand, the seek motor control circuit 78 controls the seek motor 30 so as to make zero the difference between the TRANSDUCER POSITION signal fed from the triple detector circuit 70 over the line 76 and the noted reference voltage fed from the DAC 96 in response to the digital output from the microprocessor 72.

The seek motor drive circuit 98 energizes the seek motor 30 in either of two opposite directions depending upon the input voltage from the control circuit 78. When the input voltage is more than a prescribed limit, the drive circuit 98 energizes the seek motor 30 in a forward direction and, when the input voltage is not more than the limit, in a reverse direction.

Figure 4:
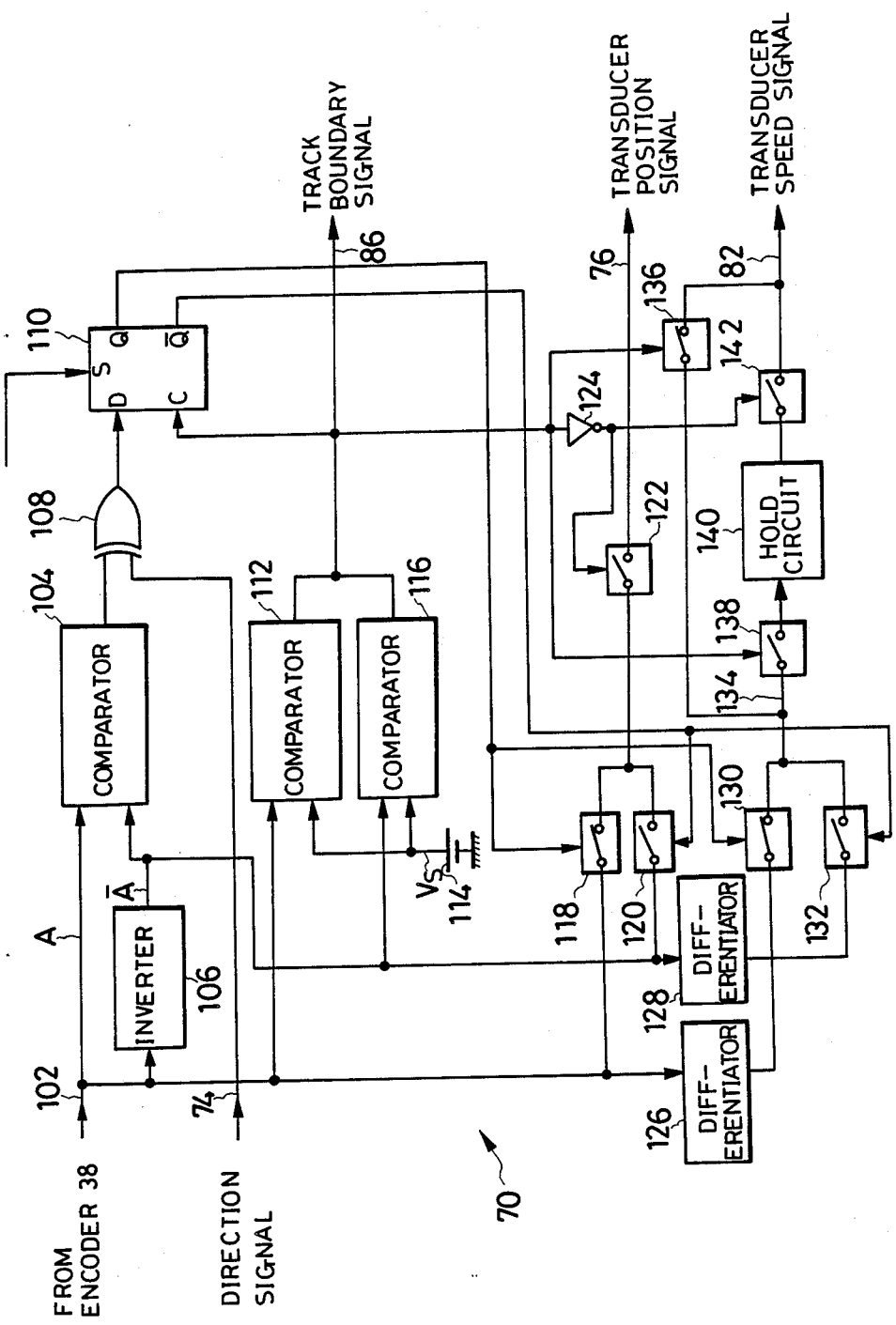
FIG. 4 is a block diagram of the triple detector circuit forming a part of the transducer position control system of FIG. 1.

We have illustrated the details of the triple detector circuit 70 in FIG. 4. At 102 is shown the output line of the monophase encoder 38, which leads to one of the two inputs of a comparator 104 on one hand and, on the other hand, to the other input of the same comparator via an inverter circuit 106. The comparator 104 provides a timing signal used for inverting the TRANSDUCER POSITION and ACTUAL TRANSDUCER SPEED signals with a change in the traveling direction of the transducer 20 (i.e. in the direction of rotation of the seek motor 30). The output of the comparator 104 is connected to an exclusive OR gate 108 whose other input is connected to the microprocessor 72 by way of the TRANSDUCER DIRECTION signal line 74. The output of the exclusive OR gate 108 is connected to the data input D of a D flip flop 110.

The triple detector circuit 70 includes a second comparator 112 which has a first input connected to the encoder output line 102 and a second input to a reference voltage source 114. The reference voltage Vs from the source 114 is slightly less than the expected maximum value of the output waveform of the monophase encoder 38, so that the second comparator 112 puts out pulses representative of the peaks of the encoder output waveform.

Also included is a third comparator 116 having a first input connected to the inverter circuit 106 and a second output to the reference voltage source 114. It will therefore be seen that the third comparator 116 provides pulses representative of the peaks of the inversion of the encoder output waveform.

The outputs of the second 112 and third 116 comparators are both connected to the TRACK BOUNDARY signal line 86 leading to the microprocessor 72. Thus the output pulses of the comparators 112 and 116 conjointly provides the TRACK BOUNDARY signal indicative of the boundaries 60, FIG. 3, between the data tracks 56 on the magnetic disk 12.

The D flip flop 110 for the provision of the noted timing signal has its clock input C connected to the TRACK BOUNDARY signal line 86. Consequently, the D flip flop 110 latches the output from the exclusive OR gate 108 in response to the leading edges of the TRACK BOUNDARY pulses from the comparators 112 and 116. The "power on" detector circuit 90 is connected to the preset input S of the D flip flop 110 in order to make its Q output high when the data system 10 is electrically turned on.

A first position signal switch 118 is connected between the encoder output line 102 and the TRANSDUCER POSITION signal line 76, and a second position signal switch 120 is connected between the inverter circuit 106 and the TRANSDUCER POSITION signal line 76. The first position signal switch 118 has a control input connected to the Q output of the D flip flop 110, whereas the second position signal switch 120 has its control input connected to the Q̄ output of the D flip flop 110. The outputs of the first 118 and second 120 position signal switches are jointly connected to the TRANSDUCER POSITION signal line 76 via a position signal suppress switch 122. This suppress switch has a control input connected to the TRACK BOUNDARY signal line 86 via a NOT circuit 124. Thus the TRANSDUCER POSITION signal is suppressed during the durations of the TRACK BOUNDARY pulses, since the TRANSDUCER POSITION signal is poor in linearity at the track boundaries.

First 126 and second 128 differentiators are employed for deriving the TRANSDUCER SPEED signal from the monophase encoder output. The first differentiator 126 is connected between the encoder output line 102 and a first speed signal switch 130, and the second differentiator 128 between the inverter circuit 106 and a second speed signal switch 132. The first speed signal switch 130 has its control input connected to the Q output of the D flip flop 110, and the second speed signal switch 132 has its control input connected to the Q̄ output of the D flip flop 110.

The outputs of the two speed signal switches 130 and 132 are connected to a common output line 134 which is connected, on one hand, to the TRANSDUCER SPEED signal line 82 via a first output select switch 136 and, on the other hand, to the same signal line 82 via a series circuit of a sampling switch 138, hold circuit 140 and second output select switch 142. The first output select switch 136 has a control input connected to the TRACK BOUNDARY signal line 86 thereby to be opened during the duration of each TRACK BOUNDARY pulse. The sampling switch 138 has a control input also connected to the TRACK BOUNDARY signal line 86 thereby to be closed during the duration of each TRACK BOUNDARY pulse. The hold circuit 140 holds and puts out the input voltage value at the instant the sampling switch 138 becomes closed. The second output select switch 142 has a control input connected to the NOT circuit 124 thereby to be closed during the duration of each TRACK BOUNDARY pulse.

Figure 5:
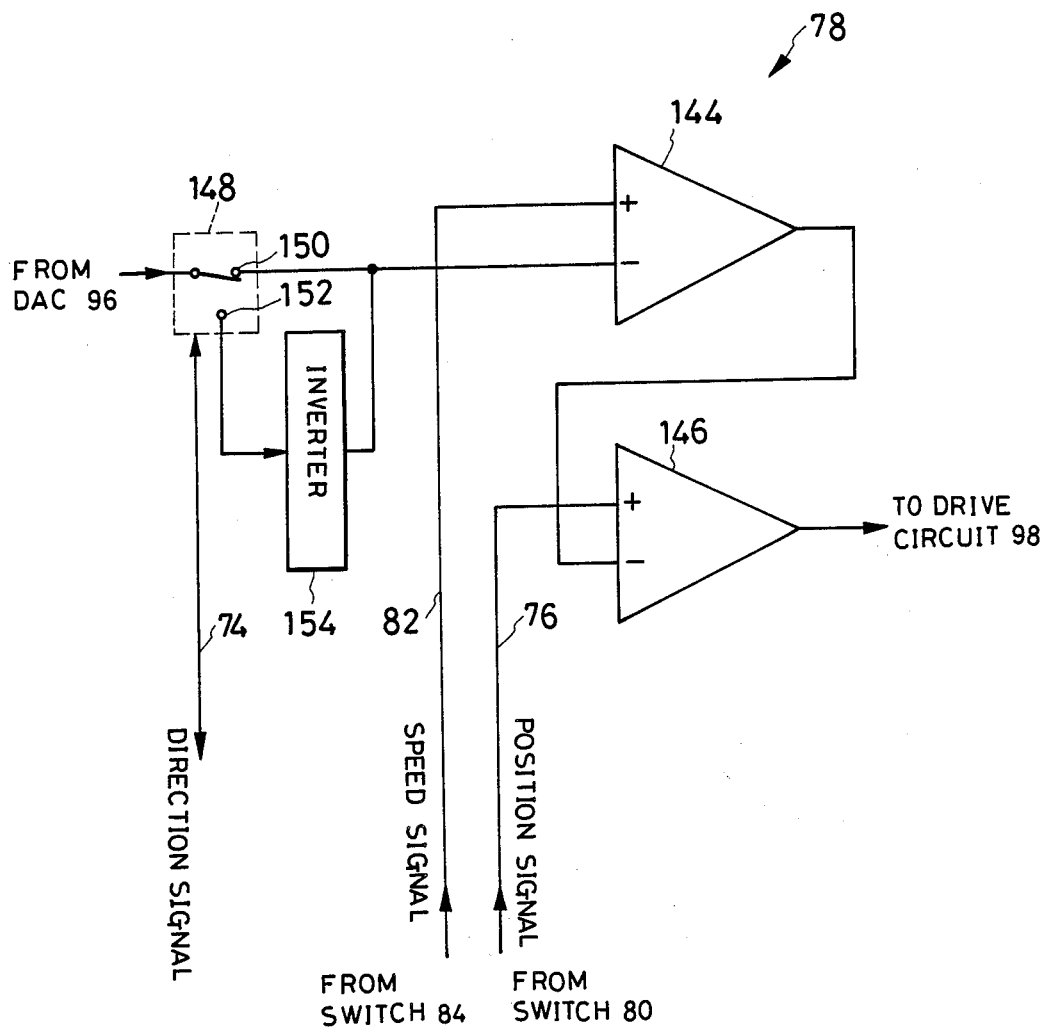
FIG. 5 is a block diagram of the seek motor control circuit also forming a part of the transducer position control system of FIG. 1.

FIG. 5 is a detailed illustration of the seek motor control circuit 78. It comprises a speed control (seek) differential amplifier 144 and a position control (centering) differential amplifier 146. The speed control differential amplifier 144 has a first input connected to the TRANSDUCER SPEED signal line 82 leading to the triple detector circuit 70 via the switch 84, and a second input connected to the DAC 96 via a switch 148. This switch has a first contact 150 connected directly to the differential amplifier 144, and a second contact 152 connected thereto via an inverter circuit 154. The switch 148 connects the DAC 96 to either of the contacts 150 and 152 depending upon the state of the TRANSDUCER DIRECTION signal fed from the microprocessor 72 over the line 74. The position control differential amplifier 146 has a first input connected to the TRANSDUCER POSITION signal line 76 leading to the triple detector circuit 70 via the switch 80, and a second input connected to the speed control differential amplifer 144. The output of the position control differential amplifier 146 is connected to the seek motor drive circuit 98.

OPERATION

We understand that, as is conventional in the art, the transducer 20 is placed on a landing zone located radially inwardly of the concentric data tracks 56 on the magnetic disk 12 when the data storage and retrieval system 10 is not powered electrically. Further, when the system is switched on, the transducer 20 is to be transported from the landing zone to a home track which in this case is the outermost Track Zero on the magnetic disk 12.

The disk drive motor 16 will start rotation when the system 10 is electrically turned on. The speed of rotation of this motor 16 and therefore of the magnetic disk 12 will be so fast that the transducer 20 will ride over the disk through a thin film of air. The "power on" detector circuit 90 will put out a pulse upon powering of the system 10, for delivery both to the microprocessor 72 and to the preset input S, FIG. 4, of the D flip flop 110 of the triple detector circuit 70. The microprocessor 72 will respond to the incoming "power on" pulse by producing signals for initializing the transducer 20 on the outermost home track on the magnetic disk 12. The initialization signals include the high TRANSDUCER DIRECTION signal, shown at (D) in FIG. 6, for transporting the transducer 20 from the landing zone to the home track, and the REQUESTED TRANSDUCER SPEED signal for high speed transporation of the transducer. The TRANSDUCER DIRECTION signal is delivered over the line 74 to the exclusive OR gate 108, FIG. 4, of the triple detector circuit 70.

Figure 6:
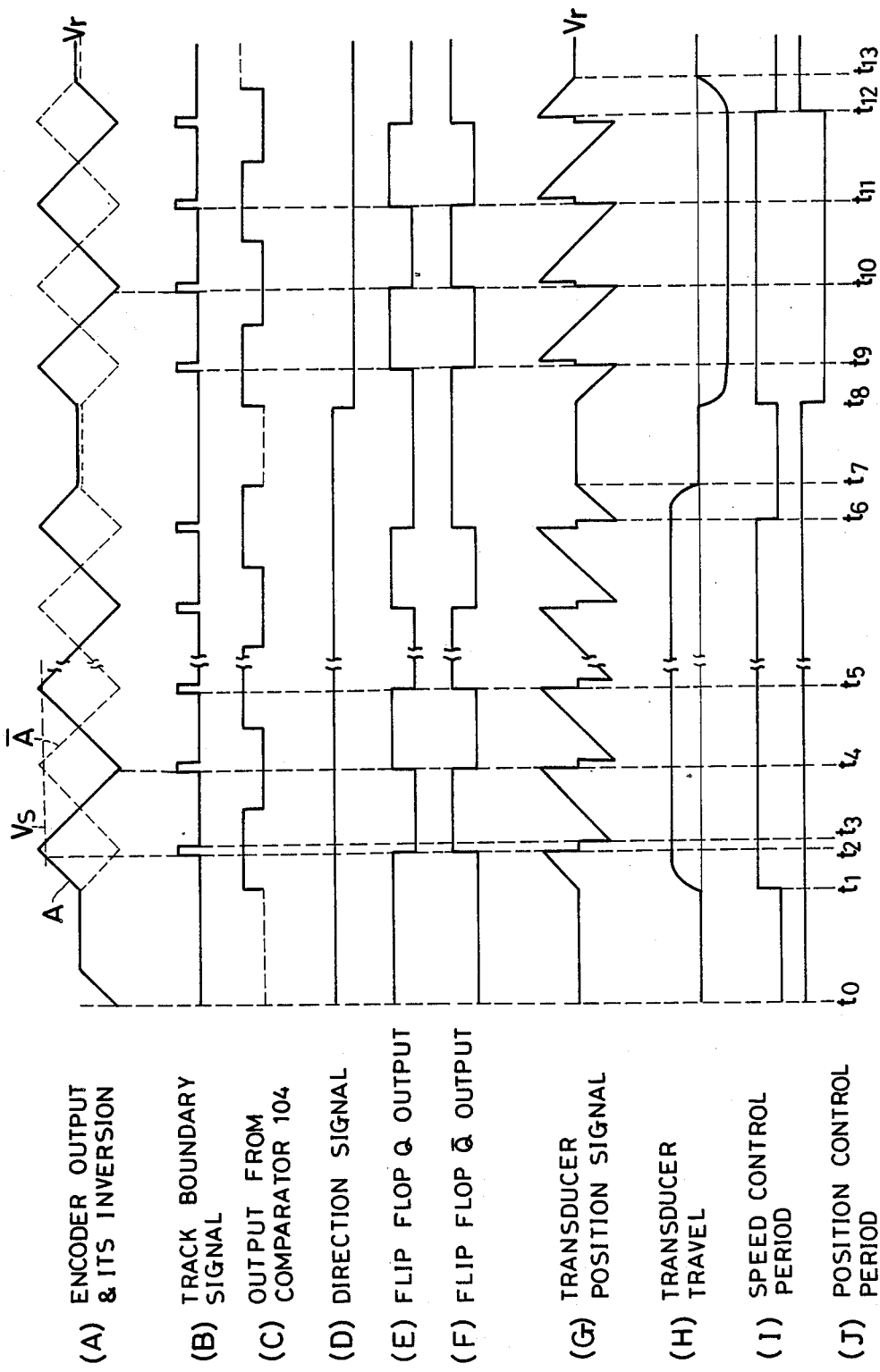
FIG. 6, consisting of (A)–(J), is a series of waveform and timing diagrams useful in explaining the operation of the triple detector circuit of FIG. 4 in particular.

As indicated at (I) in FIG. 6, the microprocessor 72 delivers the SPEED CONTROL PERIOD signal over the line 94 to the switch 84. This signal is low for a prescribed time t0–t1 after the system 10 has been switched on, holding the switch 84 open during that time for inhibiting speed control. Also, as shown at (J) in FIG. 6, the microprocessor 72 will put out the POSITION CONTROL PERIOD signal over the line 100, which signal is high to close the switch 80 on the TRANSDUCER POSITION signal line 76 and hence to permit position control of the transducer 20. The microprocessor 72 will also put out digital data indicative of the reference voltage Vr, for conversion into the analog reference voltage Vr by the DAC 96. This voltage is equivalent to the reference or intermediate voltage of the TRANSDUCER POSITION signal shown at (G) in FIG. 6.

In response to the high TRANSDUCER DIRECTION signal fed from the microprocessor 72 over the line 74, the switch 148, FIG. 5 of the seek motor control circuit 78 will connect the DAC 96 to the inverter circuit 154, so that the reference voltage Vr will be inverted prior to application to the differential amplifier 144. Since the ACTUAL TRANSDUCER SPEED signal from the triple detector circuit 70 is inhibited during the initialization period t0–t1, the differential amplifier 144 will provides an output proportional to the incoming inverted reference voltage. This output will be impressed to the position control differential amplifier 146.

The angular positional relationship between the rotary disk 40 and the fixed plate 42, both shown in FIGS.

1 and 2, is indefinite when the system 10 is turned on. However, the angular position of the rotary disk 40 is automatically readjusted with respect to the fixed plate 42 so that the output waveform of the monophase encoder 38 will be rising, as depicted at (A) in FIG. 6, at the commencement of operation in the seek mode. We will explain with reference to FIG. 8 how the angular position of the rotary disk is so automatically readjusted.

As the DAC 96 provides the reference voltage Vr upon powering of the system 10, the position control differential amplifier 146 of the seek motor control circuit 78 will compare this reference voltage with the TRANSDUCER POSITION signal fed from the triple detector circuit 70 over the line 76 and will control the seek motor 30 so as to zero the difference between the two input signals. The drive circuit 98 will drive the seek motor 30 in the reverse direction, thereby causing the transducer 20 to travel radially outwardly of the magnetic disk 12, if the output voltage of the differential amplifier 146 is less than the reference voltage Vr, and in the forward direction if the differential amplifier output voltage is more than the reference voltage.

Figure 8:
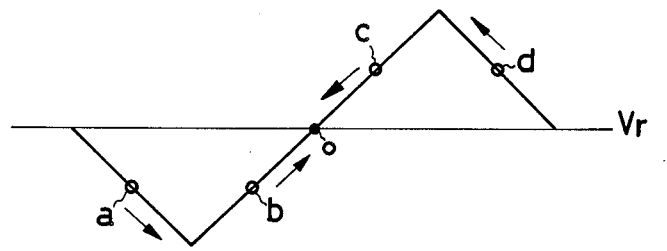
FIG. 8 is a waveform diagram explanatory of the initialization of the output from the monophase encoder of FIGS. 1 and 2.

The triangular waveform seen in FIG. 8 diagrammatically represents the TRANSDUCER POSITION signal derived from the monophase encoder output when the transducer 5 travels radially outwardly of the magnetic disk 12 at a constant speed. Let us assume that when the system 10 is turned on, the rotary disk 40 of the monophase encoder 38 is in such an angular position with respect to the fixed plate 42 that the encoder starts production of its output at either point a or point b in FIG. 8. Then, energized from the drive circuit 98 so as to drive the transducer 20 radially outwardly of the magnetic disk 12, the seek motor 30 will come to a stop when the monophase encoder output (TRANSDUCER POSITION signal) equals the reference voltage Vr at point 0. The rotary disk 40 may be so positioned with respect to the fixed plate 42 that the monophase encoder 38 starts production of its output at either point c or d when the system 10 is turned on. In that case the seek motor 30 will be energized so as to drive the transducer 20 radially inwardly of the magnetic disk 12 and will stop when the encoder output equals the reference voltage Vr at the point 0.

Thus, when the unshown system power switch is closed, the rotary disk 40 is automatically initialized so that the monophase encoder 38 may start production of its output (TRANSDUCER POSITION signal) at the point 0 in FIG. 8. We have indicated at (A) in FIG. 6 that the encoder output shifts from point b to point 0 during the initialization period t0-t1.

Upon completion of the system initialization at the moment t1 the microprocessor 72 will produce the digital REQUESTED TRANSDUCER SPEED signal over the line 92. Translated into analog form by the DAC 96, the REQUESTED TRANSDUCER SPEED signal will be delivered to the seek motor control circuit 78. As has been explained with reference to FIG. 5, the seek motor control circuit 78 will compare the ACTUAL TRANSDUCER SPEED signal, fed from the triple detector circuit 70 over the line 82, with the REQUESTED TRANSDUCER SPEED signal and will control the drive circuit 98 so that the ACTUAL TRANSDUCER SPEED signal may equal the REQUESTED TRANSDUCER SPEED signal.

For calibration following the closure of the power switch the drive circuit 98 will energize the seek motor 30 in the reverse direction such that the transducer 20 will travel radially outwardly of the magnetic disk 12. The rotary disk 40 of the monophase encoder 38 will rotate with such reverse rotation of the seek motor 30, with the consequent travel of the transducer 20 from the landing zone toward the home track (Track Zero) on the magnetic disk 12. The encoder 38 will produce the monophase output, indicated by the solid lines designated A in FIG. 6(A), with the rotation of the rotary disk 40 relative to the fixed plate 42. We have shown the encoder output as a triangular wave for convenience only; in practice, the encoder output will be sinusoidal. We have also drawn the encoder output waveform on the assumption that the transducer 20 is traveling at a constant speed. Variations in the traveling speed of the transducer will manifest themselves as changes in the frequency of the triangular or sine wave and in the angles of its slopes.

We have already explained that the encoder 38 starts production of its output waveform at a predetermined point on its rising slope when the transducer 20 starts traveling at the moment t1. It will also be understood by referring back to FIG. 3 that the positive and negative peaks of the encoder output A correspond to the track boundaries 60 whereas the points where the encoder output crosses the reference voltage Vr (i.e. midpoints between the positive and negative peaks) correspond to the track centerlines 66.

The encoder output A is fed directly to the first 104 and second 112 comparators, FIG. 4, of the triple detector circuit 70 and is also phase inverted by the inverter circuit 106 into the inverted signal $\overline{A}$ indicated by the dashed lines in FIG. 6(A). The inverted encoder output $\overline{A}$ is applied to the first 104 and third 116 comparators. The comparators 112 and 116 will compare the respective inputs A and $\overline{A}$ with the reference voltage Vs from the source 114, the latter being slightly less in value than the positive peaks of the former, and will conjointly provide a series of TRACK BOUNDARY pulses represented at (B) in FIG. 6.

The first comparator 104, on the other hand, will produce the output shown at (C) in FIG. 6 upon comparison of the inputs A and $\overline{A}$. Since the encoder output A is infallibly positive going at the moment t1, the output from the first comparator 104 will be high. This high output will be impressed to the exclusive OR gate 108, the other input to which, the TRANSDUCER DIRECTION signal from the microprocessor 72, is high as at (D) in FIG. 6, dictating radially outward travel of the transducer 20. The output from the exclusive OR gate 108 will therefore be low. As the first TRACK BOUNDARY pulse appears at a moment t2 as at (B) in FIG. 6, the D flip flop 110 will be thereby clocked to latch the low output from the exclusive OR gate 108. Therefore, as shown at (E) and (F) in FIG. 6, the Q and $\overline{Q}$ outputs of the D flip flop 110 will go low and high, respectively, at the moment t2. The two outputs from the D flip flop 110 will be oppositely inverted thereafter with each change in the output level of the first comparator 104.

Since the Q output from the D flip flop 110 has been high until the moment t2, the first position signal switch 118 has been closed, permitting the positive going ramp of the encoder output A to travel through the switches 118 and 122 on to the TRANSDUCER POSITION signal line 76, as shown at (G) in FIG. 6. During the subsequent period t2-t4, when the flip flop Q output is low and its $\overline{Q}$ output high, the first position signal switch 118 will be open and the second position signal switch 120 closed, so that the positive going ramp of the inverted encoder output $\overline{A}$ will pass on to the POSITION SIGNAL line 76. However, as the suppress switch 122 is opened by a TRACK BOUNDARY pulse from moment t2 to moment t3, the TRANSDUCER POSITION signal will be suppressed during this brief time interval. In other words, the peak portions of the encoder output waveform A and of its inversion $\overline{A}$ are not used as parts of the TRANSDUCER POSITION signal because of their poor linearity.

During the subsequent period t4-t5 the first position signal switch 118 is closed, and the second position signal switch 120 open, so that the positive going ramp of the encoder output A will again be used as part of the TRANSDUCER POSITION signal except for the brief period following the moment t4 when the suppress switch 122 is open.

As indicated at (I) and (J) in FIG. 6, both SPEED CONTROL PERIOD and POSITION CONTROL PERIOD signals are high from moment t1 to moment t6, during which the transducer 20 is transported from the landing zone to the home track on the magnetic disk 12. The switches 80 and 84 on the TRANSDUCER POSITION signal line 76 and TRANSDUCER SPEED signal line 82 are both closed during this time interval.

The fact that the transducer 20 has reached the Track Zero home position may be conventionally ascertained either by a track zero sensor, not shown, electrically connected to the microprocessor 72 or by the microprocessor itself equipped to count the TRACK BOUNDARY pulses of FIG. 6(B). Thereupon, in response to the last TRACK BOUNDARY pulse, the microprocessor 72 will make the SPEED CONTROL PERIOD signal low at the moment t6, as at (I) in FIG. 6. The POSITION CONTROL PERIOD signal still remains high as at (J) in FIG. 6.

At the moment t6, when the transducer 20 is on the track boundary immediately before the home track, the TRANSDUCER POSITION signal is so much lower in value than the reference voltage Vr that the seek motor control circuit 78 will control the seek motor 30 so as to reduce the difference between the TRANSDUCER POSITION signal and the reference voltage. The TRANSDUCER DIRECTION signal over the line 74 is now high, as at (D) in FIG. 6, commanding transducer travel radially outwardly of the magnetic disk 12. The seek motor 30 will therefore be energized in the reverse direction commanded and will be deenergized at a subsequent moment t7 when the TRANSDUCER POSITION signal becomes equal in value to the reference voltage Vr. Now the transducer 20 has been positioned in centerline alignment with Track Zero.

We will now proceed to the description of the track seeking operation. Let us suppose that the microprocessor 72 is commanded over the TRACK COMMAND line 88, FIG. 1, to transport the transducer 20 to Track Four at a moment t8. The TRANSDUCER DIRECTION signal over the line 74 will then go low, as at (D) in FIG. 6, dictating transducer travel radially inwardly of the magnetic disk 12. Also, as shown at (I) in FIG. 6, the SPEED CONTROL PERIOD signal over the line 94 will again go high thereby closing the switch 84 on the ACTUAL TRANSDUCER SPEED signal line 82. As the seek motor control circuit 78 causes the drive circuit 98 to energize the seek motor 30 for moving the transducer 20 to Track Four under the seek command, the monophase encoder 38 will resume production of the triangular waveform A as at (A) in FIG. 6. This encoder output A, and its inversion $\overline{A}$ from the inverter circuit 106, FIG. 4, will both be fed to the comparator 104 thereby causing the latter to produce the output seen at (C) in FIG. 6.

During the time interval t8-t12, when the SPEED CONTROL PERIOD signal is high, the TRANSDUCER DIRECTION signal being applied to the exclusive OR gate 108, FIG. 4, of the triple detector circuit 70 is low. Accordingly, the comparator output of FIG. 6(C) will pass the exclusive OR gate 108 without being phase inverted and so will be input to the D flip flop 110. The $\overline{Q}$ output from the flip flop 110 will be high until the moment t9 when the first TRACK BOUNDARY pulse appears, permitting the second position signal switch 120 to pass the negative going ramp of the inverted encoder output from the inverter circuit 106. Similarly, since the transducer 20 is now traveling radially inwardly of the magnetic disk 12, only the negative going ramps are derived from the encoder output A during the time intervals t9-t10 and t11-t12, and from the inverted encoder output $\overline{A}$ during the time intervals t10-t11 and t12-t13.

The SPEED CONTROL PERIOD signal will go low at the moment t12 when the microprocessor 72 ascertains from the incoming TRACK BOUNDARY pulses that the transducer 20 has reached the track boundary immediately before Track Four. Further, as the POSITION CONTROL PERIOD signal goes high at the moment t12, the seek motor control circuit 78 will respond to the TRANSDUCER POSITION signal from moment t12 to moment t13, controlling the seek motor 30 so as to make the TRANSDUCER POSITION signal equal in value to the reference voltage Vr. Thus the transducer 20 will be aligned on the centerline of Track Four.

Figure 7:
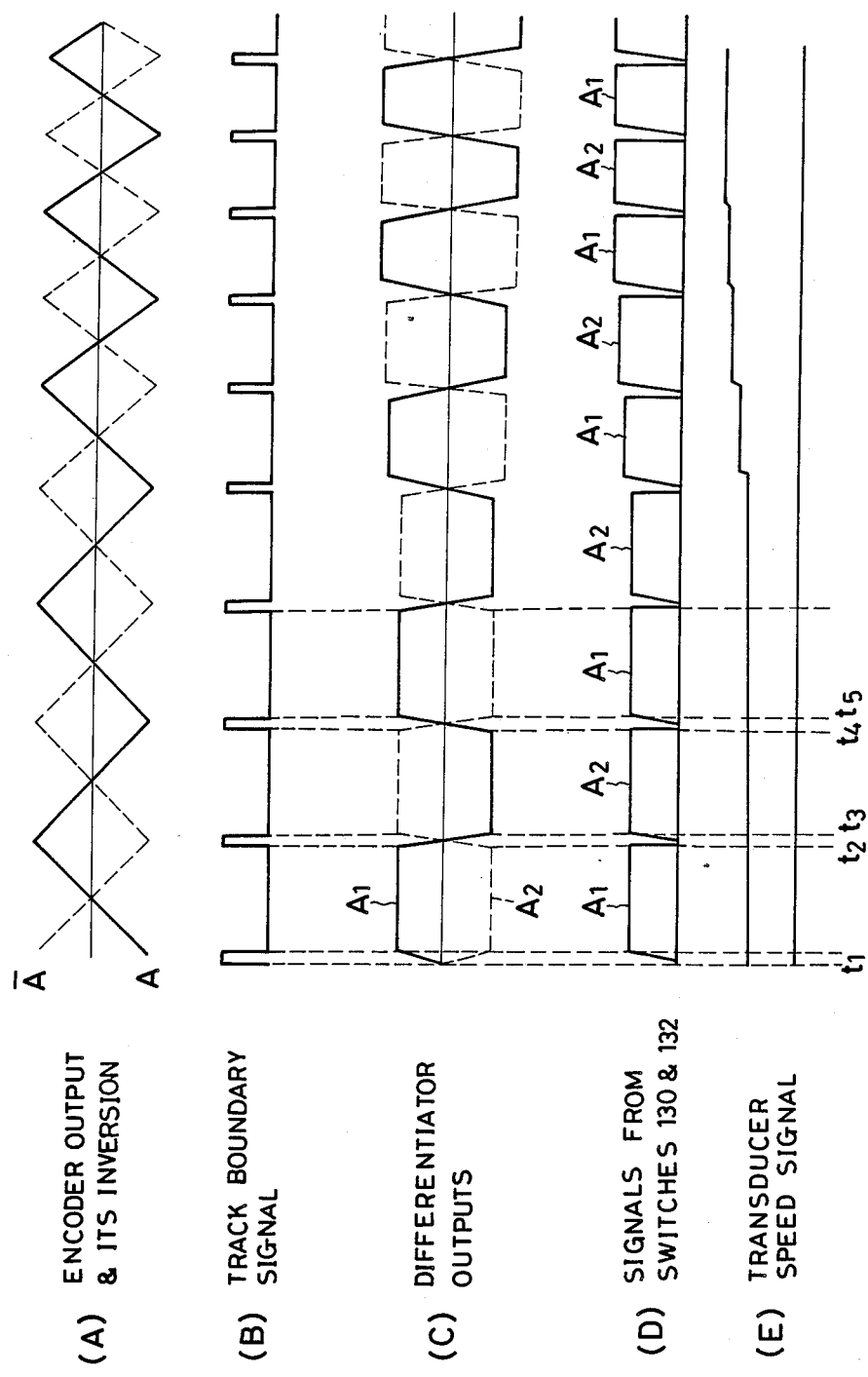
FIG. 7, consisting of (A)–(E), is a series of waveform and timing diagrams useful in explaining how the transducer speed signal is generated by the triple detector circuit of FIG. 4.

We will now discuss, with reference to FIG. 7, how the ACTUAL TRANSDUCER SPEED SIGNAL is derived by the triple detector circuit 70, shown in detail in FIG. 4, from the monophase encoder output and how the traveling speed of the transducer 20 is controlled accordingly. As the encoder output A shown at (A) in FIG. 7 is input to the first differentiator 126, the latter will produce the output A1 shown at (C) in FIG. 7. Similarly, inputting the inverted encoder output $\overline{A}$ of FIG. 7(A), the second differentiator 128 will produce the output A2 also shown by the dashed lines in FIG. 7(C). The higher the frequencies of the encoder output A and of its inversion $\overline{A}$, the higher will be the peak values of the differentiator outputs A1 and A2. Thus the differentiator outputs contain information representative of the speed of rotation of the seek motor 30.

Let us assume that the transducer 20 is now traveling radially outwardly of the magnetic disk 12. Being closed when the Q output from the D flip flop 110 is high, the first speed signal switch 130 will pass, during the time interval t1-t2, that portion of the first differentiator output A1 which corresonds to the positive going ramp of the encoder output A. Likewise, being closed when the $\overline{Q}$ output from the flip flop 110 is high, the second speed signal switch 132 will pass, during the subsequent time interval t2-t4, that portion of the second differentiator output A2 which corresponds to the positive going ramp of the inverted encoder output $\overline{A}$. Thus the waveform indicated at (D) in FIG. 7 will appear on the common output line 134 of the two speed signal switches 130 and 132.

The differentiator outputs A1 and A2 are not flat at their portions corresponding to the peak portions of the encoder output A and its inversion Ā. Consequently, as will be seen from FIG. 7(D), the signal on the speed signal switch output line 134 abruptly drops in value at intervals, as from moment t2 to moment t3 and from moment t4 to moment t5, so that this signal does not yet lend itself to use as the desired ACTUAL TRANSDUCER SPEED signal. We have eliminated such discontinuities by providing the switches 136, 138 and 142 and hold circuit 130.

The first output select switch 136, through which the speed signal switch output line 134 is directly connected to the SPEED SIGNAL line 82, is opened during the durations of the TRACK BOUNDARY pulses of FIG. 7(B), that is, during the time intervals t2-t3, t4-t5, etc. Thus the switch 136 suppresses the FIG. 7(D) signal on the speed signal switch output line 134 during these time intervals, permitting only the flat portions of the signal to pass therethrough on to the SPEED signal line 82. Being closed in response to the TRACK BOUNDARY pulses, the sampling switch 138 permits the hold circuit 140 to hold the values of the FIG. 7(D) signal at the moments of the leading edges of the TRACK BOUNDARY pulses. Connected to the output of the hold circuit 140, the second output select switch 142 will be closed during the durations of the TRACK BOUNDARY pulses, permitting the held values of the FIG. 7(D) signal to pass on to the SPEED signal line 82. There is thus obtained the continuous ACTUAL TRANSDUCER SPEED signal of FIG. 7(E) on the line 82.

The ACTUAL TRANSDUCER SPEED signal is fed to the seek motor control circuit 78 when the switch 84 on the line 82 is closed by the SPEED CONTROL PERIOD signal from the microprocessor 72. As has been set forth with reference to FIG. 5, the seek motor control circuit 78 compares the incoming ACTUAL TRANSDUCER SPEED signal with the REQUESTED TRANSDUCER SPEED signal fed from the microprocessor 72 via the DAC 96 and controls the seek motor 30 so as to approximate the former to the latter.

ALTERNATE EMBODIMENT

FIG. 9 shows an alternative triple detector circuit 70a for use in the data storage and retrieval system 10 of FIG. 1 in substitution for the triple detector circuit 70 shown in detail in FIG. 4. The triple detector circuit 70a features modified means for driving the TRACK BOUNDARY signal from the monophase encoder output but is identical with the circuit 70 in the other respects. We will therefore describe only the modified means for providing the TRACK BOUNDARY signal.

As will be recalled by referring to FIG. 4 again, we have obtained the TRACK BOUNDARY signal in the original triple detector circuit 70 by employing two comparators 112 and 116 for comparing the encoder output and its inversion with a reference voltage which is close in value to the peaks of the triangular or sinusoidal encoder output. Although this scheme is satisfactory for all practical purposes, we have found a weakness arising when the encoder output frequency is particularly low and, in consequence, loses clear peaks. The comparators may then fail to make exact comparison between the reference voltage and the encoder output or its inversion by reasons of noise or vibration, giving rise to the possibility of chatter. We have obviated this danger in the alternative triple detector circuit 70a of FIG. 9.

Figure 10:
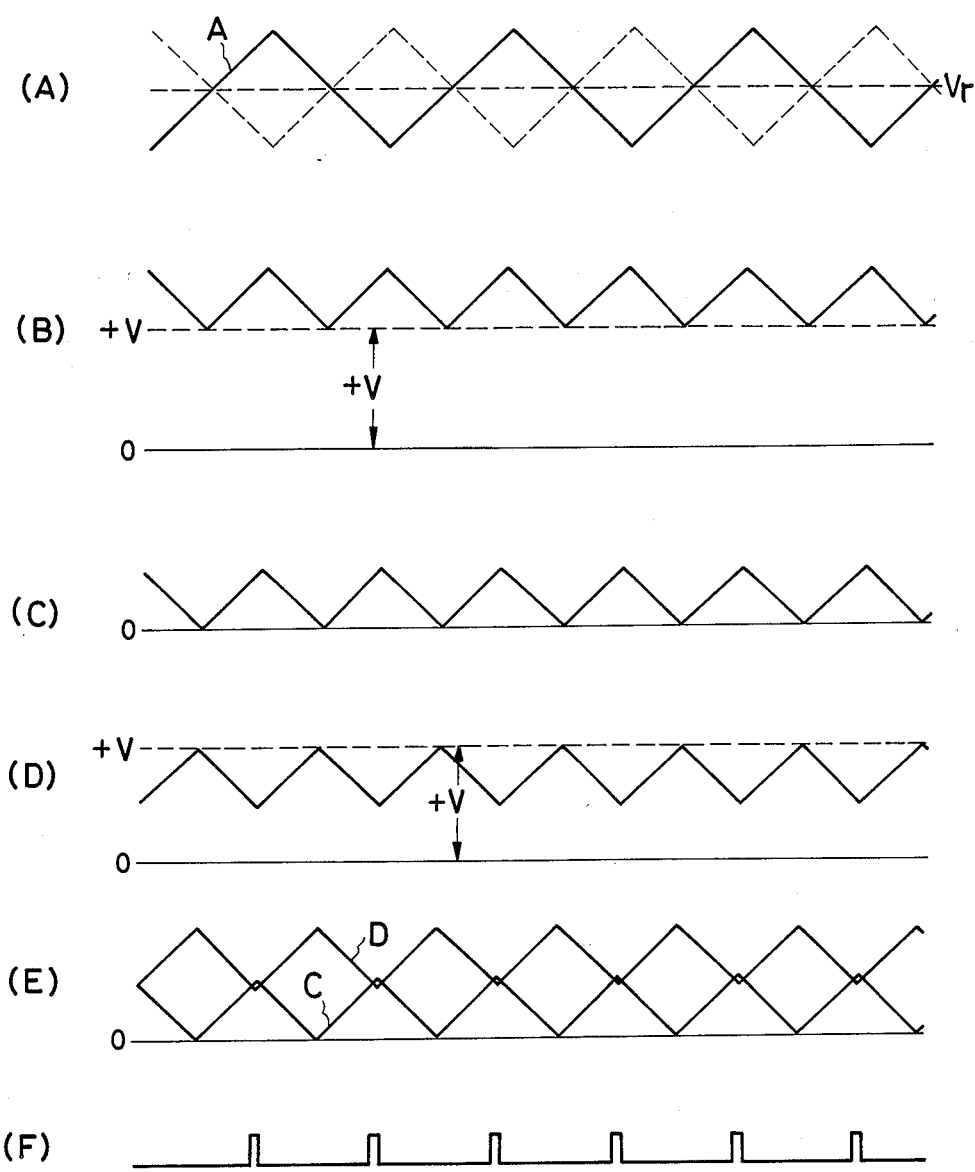
FIG. 10, consisting of (A)–(F), is a series of waveform and timing diagrams useful in explaining how the track boundary signal is generated by the alternative triple detector circuit of FIG. 9.

Employed is a full wave rectification and bias circuit 160 connected to the encoder output line 102. The operation of this circuit 160 will be best understood by referring to (A) and (B) in FIG. 10, which shows at (A) through (F) the various waveforms appearing at the correspondingly designated parts of the alternative triple detector circuit 70a. Since the monophase encoder output A of FIG. 10(A) is symmetrical with respect to the reference voltage Vr, the full wave rectification and bias circuit 160 inverts the half cycles of the encoder output below the reference voltage and further adds a direct +V bias voltage to the resulting series of half cycles. The output waveform of the circuit 160 is therefore as depicted at (B) in FIG. 10.

The full wave rectification and bias circuit 160 has its output connected to both a bias removal circuit 162 and an inverting amplifier or waveform shaping circuit 164. The bias removal circuit 162 includes an operational amplifier 166 having its noninverting input connected to the circuit 160 via a resistor 168, besides being grounded via another resistor 170. The inverting input of the operational amplifier 166 is connected to a +V volt supply terminal 172 via a resistor 174 and to the output of the amplifier 166 via a resistor 176. Thus the bias removal circuit 162 removes the +V bias voltage contained in the output from the full wave rectification and bias circuit 160, providing the output shown at (C) in FIG. 10.

The inverting amplifier circuit 164 also comprises an operational amplifier 178 having its inverting input connected to the full wave rectification and bias circuit 160 via a resistor 180 and to its own output via a resistor 182. The noninverting input of the operational amplifier 178 is connected to a +V volt supply terminal 184 via a resistor 186. Thus the inverting amplifier circuit 164 inverts the output waveform of FIG. 10(B) from the circuit 160 with respect to the +V bias voltage, providing the output shown at (D) in FIG. 10.

The operational amplifiers 166 and 178 of both circuits 162 and 164 are connected to the separate inputs of a comparator 188. Therefore, as shown at (E) in FIG. 10, the comparator 188 will compare the two input waveforms C and D and provide a series of TRACK BOUNDARY pulses seen at (F) in FIG. 10. The comparator output will be little affected by noise or vibration because the values of the two comparator inputs change in opposite directions in the neighborhoods of their overlapping parts.

POSSIBLE MODIFICATIONS

Although we have shown and described our invention in terms of specific embodiments thereof, we do not wish our invention to be limited by the exact details of this disclosure. The following is a brief list of possible modifications or alterations of the above disclosed embodiments which we believe fall within the scope of our invention:

1. The illustrated construction of the monophase encoder, having a multiapertured rotary disk driven by the seek motor, is by way of example only; instead, an elongate member, also multiapertured, may be coupled to the carriage or to an equivalent member movable linearly with the transducer.

2. The seek motor could take the form of a stepping motor, voice coil motor, etc., instead of the exemplified brushless dc motor.

3. One or more differentiators could be provided on the output side of the switches 130 and 132, FIG. 4, to obtain the ACTUAL TRANSDUCER SPEED signal.

4. The monophase encoder may be temperature compensated.

5. Our invention may be applied not only to magnetic disk systems but also to those having an optical transducer for data transfer with disklike record media.

What we claim is:

1. In an apparatus for data transfer with a disklike record medium having a multiplicity of concentric data tracks formed thereon with a predefined pitch, there being a centerline on each data track and boundaries between the data tracks, in combination:
   (a) means for imparting rotation to the record medium;
   (b) a transducer for data transfer with the record medium;
   (c) positioning means including an electric seek motor for transporting the transducer across the data tracks on the record medium in order to position the transducer on any desired track;
   (d) an encoder comprising:
      (1) a fixed member having an aperture defined therein;
      (2) a movable member disposed opposite the fixed member and bidirectionally movable relative to the fixed member in step with the transducer, the movable member having defined therein a multiplicity of equally spaced apertures, with nonapertured parts intervening therebetween, which are arranged in a row in the direction of the movement of the movable member, each aperture of the movable member being defined in part by a pair of opposed side edges of the movable member extending across the direction of the movement of the movable member, each aperture and each nonapertured part of the movable member having a centerline extending across the direction of the bidirectional movement of the movable member, the dimensions of each aperture and each nonapertured part of the movable member as measured substantially in the direction of the movement of the movable member being equal to each other and to the pitch of the data tracks on the record medium, the movable member and the record medium being in prescribed phase relation to each other such that the centerlines of the apertures and nonapertured parts of the movable member correspond to the boundaries of the data tracks on the record medium and the side edges of the apertures correspond to the centerlines of the data tracks;
      (3) a light source; and
      (4) a photodetector to be irradiated by the light source when each aperture in the movable member comes into register with the aperture in the fixed member, the photodetector providing an electric output which varies in magnitude depending upon the intensity of irradiation by the light source;
   (e) a detector circuit connected to the photodetector of the encoder for deriving from its output a transducer position signal indicative of the position of the transducer with respect to the data tracks on the record medium; the detector circuit comprising:
      (1) a phase inverter circuit connected to the photodetector of the encoder;
      (2) a comparator having an input connected directly to the photodetector and another input connected to the phase inverter circuit for providing an output indicative of the results of comparison between the two inputs;
      (3) a track boundary detector circuit connected to the photodetector for providing a series of track boundary pulses representative of the boundaries between the data tracks on the record medium;
      (4) flip flop circuit means connected to the comparator and to the track boundary detector circuit for latching the output from the comparator on being clocked by the track boundary pulses and for providing first and second outputs having a phase difference of 180 degrees;
      (5) a first position signal switch connected to the photodetector for passing the output therefrom when actuated by the first output from the flip flop circuit means;
      (6) a second position signal switch connected to the phase inverter circuit for passing the output therefrom when actuated by the second output from the flip flop circuit means; and
      (7) output circuit means for combining the outputs from the first and second position signal switches to provide the transducer position signal, and
   (f) control circuit means connected to the detector circuit and to the seek motor of the positioning means for controlling the seek motor in response to the transducer position signal in order to position the transducer on any desired data track on the record medium in centerline alignment therewith.

2. The data transfer apparatus of claim 1 wherein the detector circuit further comprises a suppress switch connected to the output circuit means and to the track boundary detector circuit for suppressing the combined outputs during the durations of the track boundary pulses.

3. The data transfer apparatus of claim 1 wherein the detector circuit further comprises a speed signal detector circuit means for deriving from the output from the encoder an actual transducer speed signal representative of the actual traveling speed of the transducer with respect to the record medium, and wherein the apparatus further comprises a source of a requested transducer speed signal connected to the control circuit means for delivering thereto the requested transducer speed signal representative of a desired speed at which the transducer is to be moved across the data tracks on the record medium, the control circuit means controlling the speed of the seek motor so as to approximate the actual transducer speed signal to the requested transducer speed signal.

4. The data transfer apparatus of claim 3 wherein the speed signal detector circuit means of the detector circuit comprises:
   (a) a first differentiator connected to the photodetector of the encoder;
   (b) a second differentiator connected to the phase inverter circuit;
   (c) a first speed signal switch connected to the first differentiator for passing the output therefrom when actuated by the first output from the flip flop circuit means;

(d) a second speed signal switch connected to the second differentiator for passing the output therefrom when actuated by the second output from the flip flop circuit means; and (e) second output circuit means for combining the outputs from the first and second speed signal switches.

5. The data transfer apparatus of claim 4 wherein the speed signal detector circuit means of the detector circuit comprises:

(a) a first output select switch connected to the second output means and actuated by the track boundary detector circuit for inhibiting the combined outputs from the first and second speed signal switches during the durations of the track boundary pulses;

(b) a sampling switch connected to the second output means and actuated by the track boundary detector circuit for sampling the combined outputs from the first and second speed signal switches in response to the track boundary pulses;

(c) a hold circuit connected to the sampling switch for holding the samples of the combined outputs from the first and second speed signal switches;

(d) a second output select switch connected to the hold circuit and actuated by the track boundary detector circuit for passing the held samples during the durations of the track boundary pulses; and (e) third output means for combining the outputs from the first and second output select switches to provide the actual transducer speed signal.

6. The data transfer apparatus of claim 1 wherein the track boundary detector circuit comprises:

(a) a source of a reference voltage less then an expected peak voltage of the output from the encoder;

(b) a second comparator having an input connected directly to the photodetector of the encoder and another input connected to the reference voltage source;

(c) a third comparator having an input connected to the phase inverter circuit and another input connected to the reference voltage source; and (d) track boundary output means for combining the outputs from the second and third comparators to provide the track boundary pulses.

7. The data transfer apparatus of claim 1 wherein the track boundary detector circuit comprises:

(a) a full wave rectification and bias circuit connected to the photodetector of the encoder for providing an output which is the sum of a full wave rectification of the encoder output and a prescribed direct bias voltage;

(b) a bias removal circuit connected to the full wave rectification and bias circuit for removing the direct bias voltage from the output therefrom;

(c) a waveform shaping circuit connected to the full wave rectification and bias circuit for subtracting the full wave rectification of the encoder output from the direct bias voltage; and (d) a comparator having an input connected to the bias removal circuit and another input connected to the waveform shaping circuit for providing a track boundary pulse when one input is higher in value than the other input.

* * * * *

UNITED STATES PATENT AND TRADEMARK OFFICE
CERTIFICATE OF CORRECTION

PATENT NO.   :  4,875,116

DATED        :  October 17, 1989

INVENTOR(S)  :  Kazuhiko Yasuda and Sumio Wada

It is certified that error appears in the above-identified patent and that said Letters Patent is hereby corrected as shown below:

On the title page before item [57] in the Attorney, Agent, or Firm change "Woodcock Washbutn Kurtz" to read
--Woodcock Washburn Kurtz Mackiewicz & Norris--.

Signed and Sealed this

Fifth Day of May, 1992

Attest:

DOUGLAS B. COMER

*Attesting Officer*　　　　Acting Commissioner of Patents and Trademarks